United States Patent
Sakai et al.

(10) Patent No.: US 10,120,388 B2
(45) Date of Patent: Nov. 6, 2018

(54) CONTROL SYSTEM FOR WORK MACHINE, WORK MACHINE, AND CONTROL METHOD FOR WORK MACHINE

(71) Applicant: Komatsu Ltd., Tokyo (JP)

(72) Inventors: Atsushi Sakai, Chigasaki (JP); Mitsuhiro Ryuman, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/316,247

(22) PCT Filed: Mar. 31, 2016

(86) PCT No.: PCT/JP2016/060847
§ 371 (c)(1),
(2) Date: Dec. 5, 2016

(87) PCT Pub. No.: WO2016/148310
PCT Pub. Date: Sep. 22, 2016

(65) Prior Publication Data
US 2017/0285657 A1  Oct. 5, 2017

(51) Int. Cl.
*G05D 1/02* (2006.01)
*E02F 9/20* (2006.01)
*E02F 3/32* (2006.01)

(52) U.S. Cl.
CPC ......... *G05D 1/0276* (2013.01); *E02F 9/2045* (2013.01); *G05D 1/0212* (2013.01); *E02F 3/32* (2013.01); *G05D 2201/0202* (2013.01)

(58) Field of Classification Search
CPC ........ E02F 3/32; E02F 9/2045; G05D 1/0212; G05D 1/0276; G05D 2201/0202

(Continued)

(56) References Cited

U.S. PATENT DOCUMENTS 6,292,751 B1    9/2001  Frank
6,315,062 B1   11/2001  Alft et al.
(Continued)

FOREIGN PATENT DOCUMENTS

CA    2934879 A1    7/2015
JP    11-183590 A   7/1999
(Continued)

OTHER PUBLICATIONS

Office Action dated Jan. 24, 2017, issued for the corresponding Australian patent application No. 2016234213.
International Search Report dated Jun. 21, 2016, issued for PCT/JP2016/060847.

*Primary Examiner* — Tyler J Lee
(74) *Attorney, Agent, or Firm* — Locke Lord LLP

(57) ABSTRACT

A control system for a work machine includes a non-contact sensor, a position output device, a correction position calculation unit, and a control device. The non-contact sensor detects a periphery of a work machine. The position output device determines a position of the work machine based on at least a detection result of the non-contact sensor, and outputs information of the position. The correction position calculation unit corrects the position determined by the position output device based on delay time including at least a delay in communication with the position output device. The control device generates a command for controlling the work machine using the corrected position corrected by the correction position calculation unit.

5 Claims, 9 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 7,268,700 | B1 * | 9/2007 | Hoffberg | G08G 1/0104 340/539.17 |
| 8,306,726 | B2 | 11/2012 | Donnelli et al. | |
| 8,378,854 | B1 * | 2/2013 | Siris | G01S 19/07 340/3.3 |
| 8,655,588 | B2 * | 2/2014 | Wong | G01S 17/023 701/500 |
| 9,134,426 | B1 * | 9/2015 | Siris | G01S 19/07 |
| 9,661,472 | B2 * | 5/2017 | Gherardi | H04W 4/04 |
| 2011/0282622 | A1 | 11/2011 | Canter | |
| 2012/0050524 | A1 * | 3/2012 | Rinner | G06T 3/40 348/117 |
| 2012/0050525 | A1 * | 3/2012 | Rinner | G06T 7/0028 348/117 |
| 2012/0303176 | A1 | 11/2012 | Wong et al. | |
| 2014/0324300 | A1 | 10/2014 | Halder et al. | |
| 2015/0142258 | A1 | 5/2015 | Sugihara et al. | |
| 2016/0209511 | A1 * | 7/2016 | Dolinar | G01S 19/14 |

FOREIGN PATENT DOCUMENTS

| | | |
|---|---|---|
| JP | 2001-033549 A | 2/2001 |
| JP | 2015-055906 A | 3/2015 |
| WO | 2015/097909 A1 | 7/2015 |

\* cited by examiner

CONTROL SYSTEM FOR WORK MACHINE, WORK MACHINE, AND CONTROL METHOD FOR WORK MACHINE

FIELD

The present invention relates to a control system for a work machine controlled using positional information, a work machine, and a control method for a work machine.

BACKGROUND

There is a work machine such as a dump truck and an excavator in which various kinds of control are performed using a position acquired by a position of its own device acquired using a positioning satellite or a position of its own device acquired by, for example, dead reckoning navigation. In a system for position measuring using a global positioning system (GPS), a system that corrects a position measuring result in consideration with a radio wave is described in Patent Literature 1.

CITATION LIST

Patent Literature

Patent Literature 1: Japanese Patent Application Laid-open No. H11-183590 A

SUMMARY

Technical Problem

In a case where a control device that controls a work machine acquires a position of the work machine by communicating with another position measuring device provided in the work machine, delay in time for acquiring the position of the work machine possibly occurs due to delay caused by the communication between the devices, delay caused by instantaneous interruption of the communication between the devices, delay caused by a difference in control cycles between the devices, delay caused by processing in the position measuring device, and the like. When the timing for the control device to acquire the position of the work machine is delayed, accordingly, deviation occurs between reference time of which the position measuring device has determined the position of the work machine and the time of which the control device controls the work machine. As a result, delay in the control of the work machine possibly occurs.

The present invention has an object to suppress an influence of the delay caused when the control device controls the work machine in a case where the delay occurs in the timing of the control device to acquire the position of the work machine, due to at least one of the delay caused by the communication between the devices, the delay caused by instantaneous interruption of the communication between the devices, the delay caused by a difference in control cycles between the devices, the delay caused by processing in the position measuring device, and the like.

Solution to Problem

According to the present invention, a control system for a work machine, comprises: a non-contact sensor that detects a periphery of a work machine; a position output device that determines a position of the work machine based on at least a detection result of the non-contact sensor, and outputs information of the position; a correction position calculation unit that corrects the position determined by the position output device, based on delay time including at least a delay in communication with the position output device; and a control device that generates a command for controlling the work machine using a corrected position corrected by the correction position calculation unit.

It is preferable that the control device corrects the position using dead reckoning navigation.

It is preferable that the delay time is a difference between first time, which is time when the correction position calculation unit corrects the position, and second time, which is time before the first time and time when the non-contact sensor has performed the detection or when the position output device has received the detection result of the non-contact sensor.

It is preferable that the position output device determines the position of the work machine by receiving information for determining the position from the control device, the first time is time when the information for determining the position is output to the position output device by the control device, and the second time is time when the position determined by the position output device is corrected by the correction position calculation unit, and the delay time is the difference between the second time and the first time.

It is preferable that the control device, using the dead reckoning navigation, determines a position to which the work machine has moved, during the delay time, from the position having been received by the position output device and corresponding to the first time, and defines the determined position as the position after the correction.

According to the present invention, a work machine comprises: the control system for a work machine; and a traveling device controlled by the control device included in the control system for a work machine.

According to the present invention, a control method for a work machine, comprises: detecting a periphery of a work machine by a non-contact sensor; determining a position of the work machine based on a detected result, and outputting information of the position; and correcting, based on the output information of the position, the position by dead reckoning navigation using delay time including a delay caused when the information of the position has been received, and generating a command for controlling the work machine using the position after the correction.

The present invention can suppress an influence of the delay caused when the control device controls the work machine.

DESCRIPTION OF EMBODIMENTS

A mode (embodiment) for carrying out the present invention will be described in detail with reference to the drawings.

Figure 1:
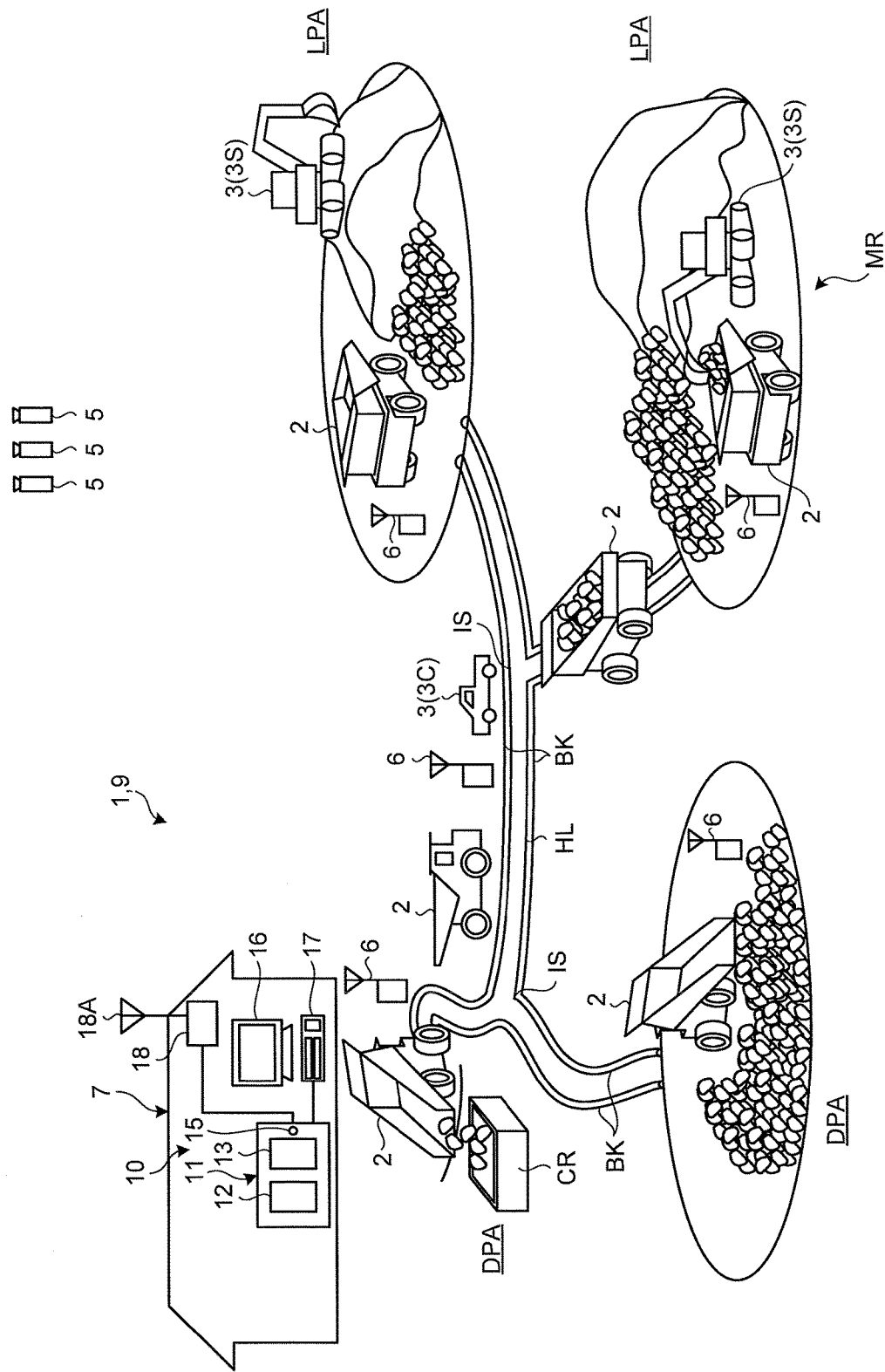
FIG. 1 is a view illustrating an example of a site in which a work machine according to an embodiment is used.

FIG. 1 is a view illustrating an example of a site in which a working vehicle according to the embodiment is used. In the embodiment, the working vehicle is a mining machine used in a mine MR. In the embodiment, the mining machine is managed by a management system 1. The management of the mining machine includes at least one of an operational management of the mining machine, the evaluation of the productivity of the mining machine, the evaluation of an operational technique of an operator who operates the mining machine, the maintenance of the mining machine, and the abnormality diagnosis of the mining machine.

The mining machine is a generic term for machines used in various work in the mine MR. The mining machine includes at least one of a boring machine, an excavating machine, a loading machine, a transporting machine, a crusher, and a vehicle in which a worker operates. The excavating machine is a machine that excavates the mine MR. The loading machine is a machine that loads a cargo onto the transporting machine. The loading machine includes at least one of an excavator, an electric shovel, and a wheel loader. The transporting machine is a machine that moves in the mine MR to transport the cargo. The transporting machine includes a dump truck. The cargo includes soil and/or ores generated by the mining operation in the mine MR.

The mine MR includes at least portions of a loading area LPA, a discharging area DPA, a conveying path HL, and an intersection IS. The conveying path HL leads to the loading area LPA and/or the discharging area DPA. The conveying paths HL intersect with each other at the intersection IS. There is a case where a crusher CR that crushes discharged soil is disposed in at least one of the discharging areas DPA. The mine MR includes a bank BK, which is formed with piled-up soil, along the conveying path HL. The bank BK may be provided at an outer side of the loading area LPA and/or an outer side of the discharging area DPA.

A dump truck 2 moves in the mine MR to transport the cargo. The dump truck 2 travels on at least the portions of the conveying path HL and the intersection IS in the mine MR to move between the loading area LPA and the discharging area DPA. The cargo is loaded onto the dump truck 2 at the loading area LPA. The loading area LPA is an area (place) at which the cargo is loaded in the mine MR. At the loading area LPA, a loading machine, which is another mining machine other than the dump truck 2, loads the cargo onto the dump truck 2.

The dump truck 2 unloads (discharges) the cargo at the discharging area DPA. The discharging area DPA is an area (place) at which the cargo is discharged in the mine MR. At the discharging area DPA provided with the crusher CR, the dump truck 2 discharges the soil, which is the cargo, into the crusher CR.

In the embodiment, the dump truck 2 autonomously travels on a traveling path RP by a command from a management device 10, and is a so-called unmanned dump truck. When the dump truck 2 autonomously travels, an operation by an operator (driver) is unnecessary. The autonomous traveling of the dump truck 2 refers to traveling of the dump truck 2 by the command from the management device 10, and not by the operation of the operator. In the embodiment, however, the dump truck 2 can travel by the operation of the operator.

The management system 1 is provided with the management device 10 and a communication system 9. The management device 10 manages the mining machine operating in the mine MR. The communication system 9 transmits information. The management device 10 is installed in a control facility 7 of the mine MR. The communication system 9 transmits information among the management device 10, the dump truck 2, and another mining machine 3 (such as a hydraulic shovel 3S and a vehicle 3C) by wireless communication. The management device 10, the dump truck 2, and the other mining machine 3 are capable of interactive wireless communication via the communication system 9. In the embodiment, the communication system 9 includes a plurality of repeaters 6 that relay signals (radio waves) between the management device 10, the dump truck 2, and the other mining machine 3.

In the embodiment, a position of the dump truck 2 and a position of the other mining machine 3 are detected using a global navigation satellite system (GNSS). A GPS is an example of the global navigation satellite system; however, the GNSS is not limited to the GPS. The GNSS includes a plurality of positioning satellites 5. The GNSS detects a position in a coordinate system that defines the latitude, the longitude, and the altitude. The coordinate system of the GNSS may be referred to as a global coordinate system in the embodiment. The position detected by the GNSS includes coordinate data of the latitude, the longitude, and the altitude.

The position of the dump truck 2 and the position of the other mining machine 3 in the mine MR are detected by the GNSS. The position detected by the GNSS is an absolute position defined in the global coordinate system. In the following description, the position detected by the GNSS is appropriately referred to as a GPS position. The GPS position is the absolute position, and the coordinate data (coordinate value) of the latitude, the longitude, and the altitude. In the GNSS, a state of a positioning changes depending on the arrangement of the positioning satellites 5, ionosphere, troposphere, or the landform around antennas that receive information from the positioning satellites 5. The state of the positioning includes, for example, a Fix solution (about ±1 cm to 2 cm from the precision), a Float solution (about ±10 cm to several meters from the precision), a Single solution (about ±several meters from the precision), and a non-positioning phase (impossible to calculate positioning).

As illustrated in FIG. 1, the management device 10 disposed in the control facility 7 is provided with a computer 11, a display device 16, an input device 17, and a wireless communication device 18. The computer 11 is provided with a processing device 12, a storage device 13, and an input/output unit 15. The display device 16, the input device 17, and the wireless communication device 18 are connected to the computer 11 via the input/output unit 15. The input/output unit 15 is used for inputting/outputting information between the processing device 12 and at least one of the display device 16, the input device 17, and the wireless communication device 18.

Figure 2:
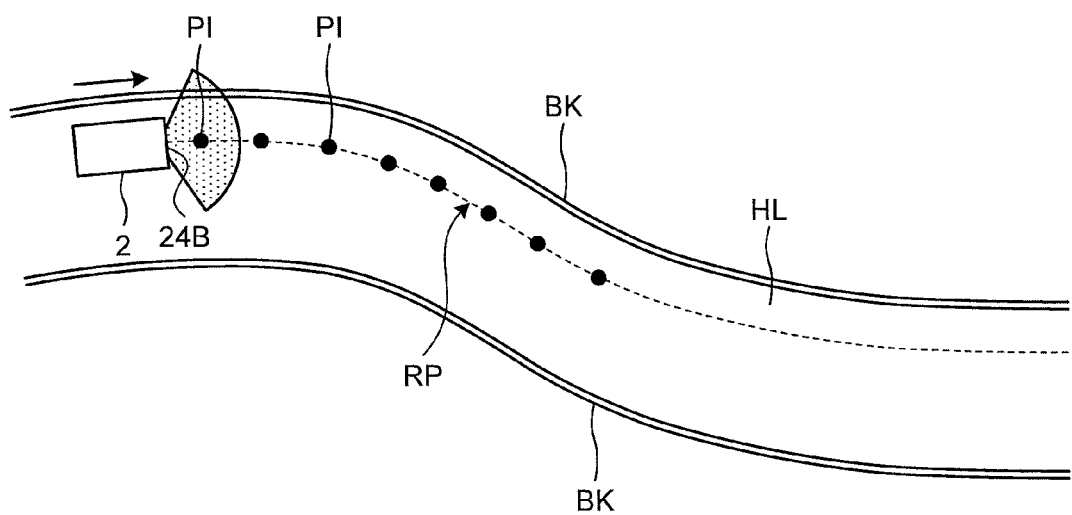
FIG. 2 is a schematic view illustrating a dump truck that travels on a conveying path.

FIG. 2 is a schematic view illustrating the dump truck 2 that travels on the conveying path HL. The processing device 12 executes various types of processing relating to the management of the dump truck 2 and various types of processing relating to the management of the other mining machine 3. When the dump truck 2 autonomously travels in the mine MR, the processing device 12 generates the traveling path RP on which the dump truck 2 travels. The traveling path RP is a set of a plurality of points PI. In other words, a track passing through the plurality of points PI is the traveling path RP. An absolute position (the coordinate data of the latitude, the longitude, and the altitude) is defined in each of the points PI. In each of the points PI that forms the traveling path RP, at least absolute positional information and speed information, which is a target speed of the dump truck traveling through such point, are included. Hereinafter, the absolute positional information and the speed information relating to the traveling path are collectively referred to as traveling path information. The dump truck 2 that has received the traveling path information from the processing device 12 travels along the traveling path RP that includes at least the portions of the loading area LPA, the discharging area DPA, the conveying path HL, and the intersection IS.

The storage device 13 is connected to the processing device 12, and stores the various types of information relating to the management of the dump truck 2 and the other mining machine 3. Moreover, the storage device 13 stores computer programs for causing the processing device 12 to execute the various types of processing. Using the computer programs stored in the storage device 13, the processing device 12 performs the processing of information relating to the position, and generates the traveling path RP.

The display device 16 can display a map that includes the conveying path HL and the like in the mine MR, display information relating to the position of the dump truck 2, and display information relating to the position of the other mining machine 3. The input device 17 includes at least one of a keyboard, a touch panel, and a mouse. Moreover, the input device 17 functions as an operation unit that can input an operation signal to the processing device 12. A manager of the control facility 7 operates the input device 17 to input a command to the processing device 12.

The wireless communication device 18 includes an antenna 18A, is disposed in the control facility 7, and is connected to the processing device 12 via the input/output unit 15. The wireless communication device 18 is a portion of the communication system 9. Moreover, the wireless communication device 18 can receive information transmitted from the dump truck 2 and/or the other mining machine 3. The information received at the wireless communication device 18 is output to the processing device 12. In addition, the information received at the wireless communication device 18 is stored (registered) in the storage device 13. The wireless communication device 18 can transmit information to the dump truck 2 and/or the other mining machine 3.

Next, the dump truck 2 will be described in detail.

<Dump Truck>

Figure 3:
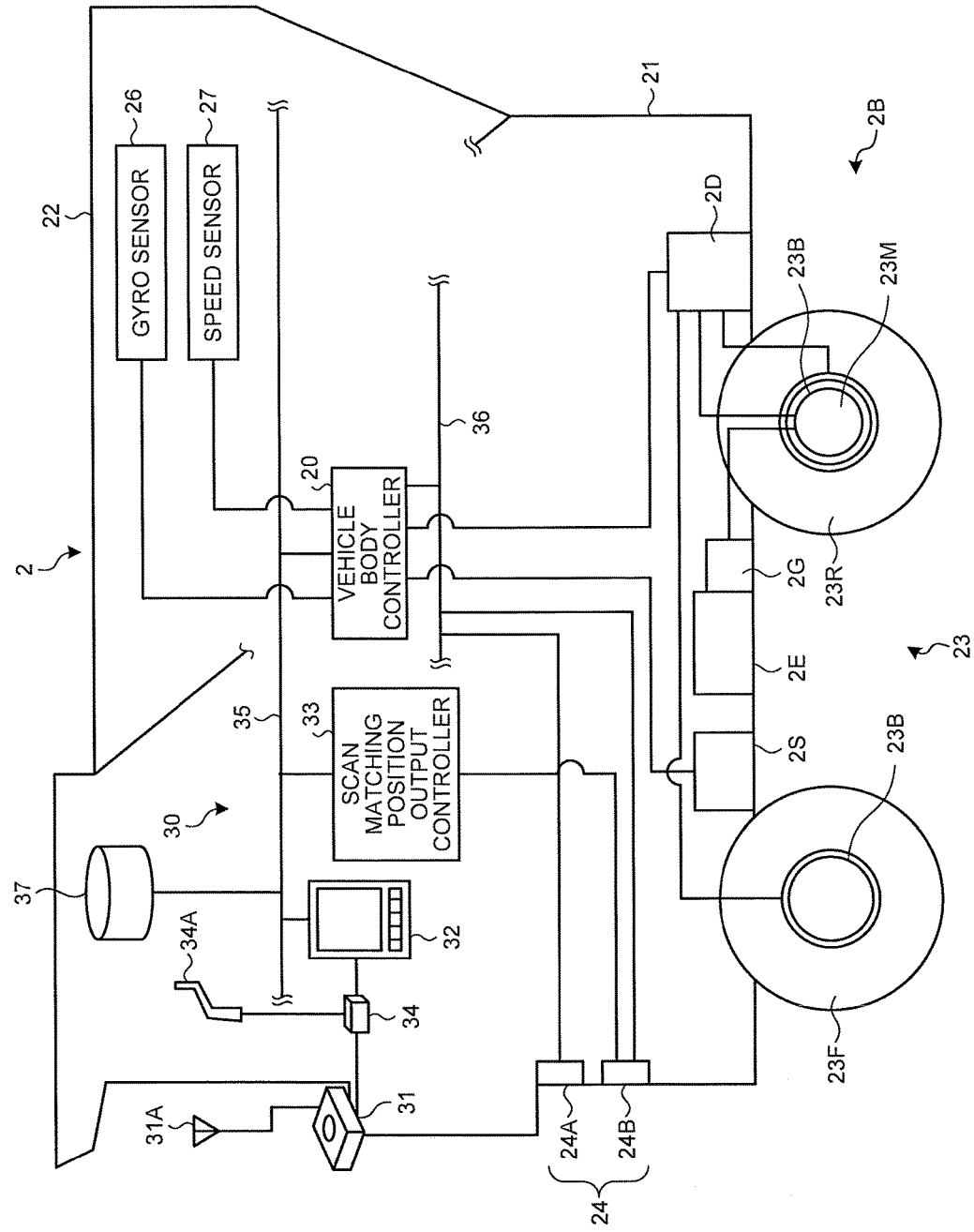
FIG. 3 is a diagram illustrating the dump truck provided with a control system for a work machine according to the embodiment.

FIG. 3 is a diagram illustrating the dump truck 2 provided with a working vehicle control system 30 according to the embodiment. In the embodiment, an example in which the dump truck 2 is provided with the working vehicle control system 30 will be described. However, the working vehicle control system 30 may be provided in the other mining machine 3 which is a working vehicle other than the dump truck 2. Hereinafter, the working vehicle control system 30 is appropriately referred to as a control system 30.

The dump truck 2 includes a vehicle main body 21, a vessel 22, a traveling device 23, and an obstacle sensor 24. The vessel 22 and the traveling device 23 are mounted on the vehicle main body 21. A driving device 2D for driving the traveling device 23 is mounted on the vehicle main body 21. The driving device 2D includes an internal combustion engine 2E such as a diesel engine, a generator 2G, and an electric motor 23M. The generator 2G is driven by the internal combustion engine 2E and generates electric power. The electric motor 23M is driven by the electric power generated by the generator 2G.

The traveling device 23 includes a front wheel 23F, a rear wheel 23R, a braking device 23B, and a steering device 2S. The front wheel 23F is steered by the steering device 2S, and functions as a steering wheel of the dump truck 2. The rear wheel 23R is driven by the electric motor 23M disposed in a wheel, and functions as a driving wheel of the dump truck 2. The driving device 2D of the dump truck 2 may drive the rear wheel 23R by transmitting motive power of the internal combustion engine 2E to the rear wheel 23R via a transmission including a torque converter.

The vessel 22 is a loading platform into which the cargo is loaded. The cargo is loaded into the vessel 22 by the loading machine. In discharging work, the vessel 22 is lifted to discharge the cargo.

The obstacle sensor 24 is arranged at a lower front portion of the vehicle main body 21. The obstacle sensor 24 detects an obstacle in front of the vehicle main body 21 in a non-contact manner. In the embodiment, the obstacle sensor 24, which is a non-contact sensor, is provided with a radar 24A and a laser sensor 24B.

The laser sensor 24B is a device that detects a position of an object that exists around the dump truck 2. The laser sensor 24B applies a laser beam in a range illustrated in FIG. 2, for example, and receives the laser beam reflected by the object. In such way, the laser sensor 24B detects a direction and distance of the object with respect to the laser sensor 24B. The object around the dump truck 2 includes an object (such as the bank BK, a side wall, an embankment, a tree, and a building) that exists along the traveling path RP. The object that exists along the traveling path RP may be a structure produced artificially. Next, the control system 30 will be described.

The control system 30 includes a scan matching navigation position output controller 33 which is a position output device, and a vehicle body controller 20 which is a control device. In addition, the control system 30 includes the non-contact sensor 24, a gyro sensor 26, a speed sensor 27, a GPS receiver 31 which is a positioning device, a traveling path creation device 32, a wireless communication device 34, a first signal line 35, and a second signal line 36. As illustrated in FIG. 3, the vehicle body controller 20, the traveling path creation device 32, and the scan matching navigation position output controller 33 are connected to the first signal line 35. The vehicle body controller 20, the traveling path creation device 32, and the scan matching navigation position output controller 33 exchange information by communicating with one another via the first signal line 35.

The vehicle body controller 20 receives the position of the dump truck 2 output from the scan matching navigation position output controller 33 and/or the GPS receiver 31. Thereafter, the vehicle body controller 20 generates and outputs a command for controlling the dump truck 2 based on the received position of the dump truck 2 and traveling path information received from the traveling path creation device 32 described later. Moreover, the vehicle body controller 20 generates and outputs a command for controlling a braking device 2B of the dump truck 2 using the received position of the dump truck 2.

The traveling path creation device 32 acquires the traveling path information generated by the processing device 12 of the management device 10 illustrated in FIG. 1, and outputs the traveling path information to the vehicle body controller 20. The traveling path creation device 32 is connected to the wireless communication device 34 connected to an antenna 34A. The wireless communication device 34 receives information transmitted from the management device 10 and/or the mining machine 3 other than a corresponding vehicle. The mining machine 3 other than the corresponding vehicle includes a dump truck 2 other than the corresponding vehicle in addition to the other mining machine 3 other than the dump truck 2.

Figure 4:
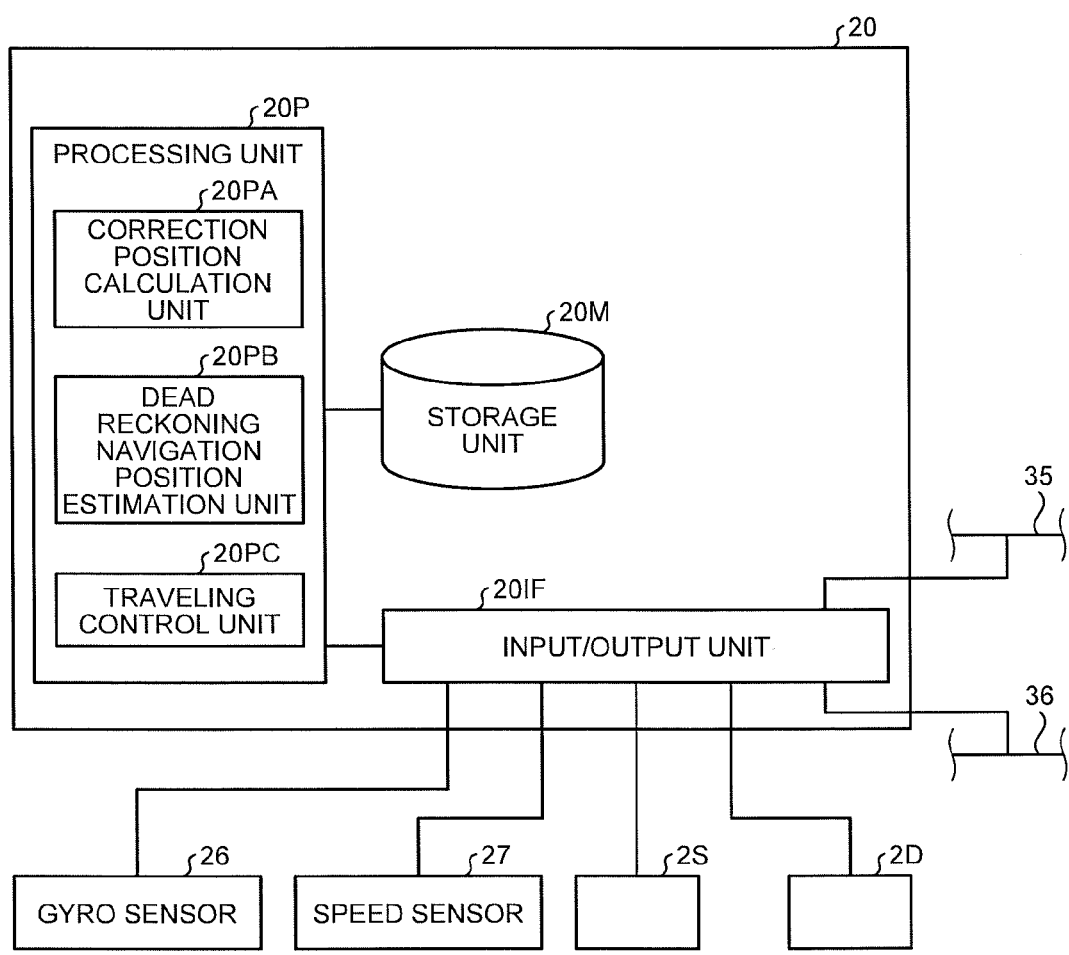
FIG. 4 is a diagram illustrating a vehicle body controller according to the embodiment.

FIG. 4 is a diagram illustrating the vehicle body controller 20 according to the embodiment. The vehicle body controller 20, which is a control unit, includes a processing unit 20P, a storage unit 20M, and an input/output unit 20IF. The processing unit 20P includes a correction position calculation unit 20PA, a dead reckoning navigation position estimation unit 20PB, and a traveling control unit 20PC.

The correction position calculation unit 20PA corrects the position of the dump truck 2 determined by the scan matching navigation position output controller 33, which is a position output device, based on at least the delay time including a delay in communication with the scan matching navigation position output controller 33. The dead reckoning navigation position estimation unit 20PB calculates the position of the dump truck 2 using a method called dead reckoning navigation described later. Specifically, the dead reckoning position estimation unit 20PB estimates the position of the dump truck 2 using an angular speed of the dump truck 2 from the gyro sensor 26 and speed of the dump truck 2 from the speed sensor 27. The traveling control unit 20PC generates the command for controlling the dump truck 2 using the corrected position corrected by the correction position calculation unit 20PA.

The storage unit 20M stores a computer program for causing the dump truck 2 to autonomously travel, and a computer program for controlling the operation of the dump truck 2. The gyro sensor 26, the speed sensor 27, the steering device 2S, a traveling control device 2D, the first signal line 35, and the second signal line 36 are connected to the input/output unit 20IF. The input/output unit 20IF is an interface between the vehicle body controller 20 and equipment connected to the vehicle body controller 20.

The wireless communication device 34 receives the traveling path information transmitted from the wireless communication device 18 of the control facility 7 illustrated in FIG. 1, and outputs the received traveling path information to the traveling path creation device 32. The GPS receiver 31 is connected to the wireless communication device 34.

In the embodiment, the dump truck 2 travels in three traveling modes. A first traveling mode is a traveling mode in which the position of the dump truck is determined using detection data of the GPS receiver 31, and the dump truck autonomously travels based on such position. The first traveling mode is appropriately referred to as a GPS traveling mode.

A second traveling mode is a traveling mode in which the position of the dump truck 2 is calculated using a method called scan matching navigation based on map information created in advance and detection data of the laser sensor 24B, as described later, and the dump truck 2 autonomously travels based on the calculated position of the dump truck 2. The second traveling mode is appropriately referred to as a scan matching navigation traveling mode. In addition, in the scan matching navigation traveling mode, the position of the dump truck 2 is calculated in the scan matching navigation position output controller calculation unit 33.

Moreover, there is a method called dead reckoning navigation for estimating the position of the dump truck 2 using the detection result of the gyro sensor 26 and the detection result of the speed sensor 27. The position of the dump truck 2 is estimated by the dead reckoning navigation in the vehicle body controller 20.

The GPS receiver 31 detects the GPS position, which is the position of the dump truck 2, using the GPS. The GPS receiver 31 is one of a plurality of positional information generation units included in the dump truck in the embodiment. An antenna 31A that receives information from the positioning satellites 5 is connected to the GPS receiver 31. The antenna 31A outputs a signal based on the information received from the positioning satellites 5 to the GPS receiver 31. In addition, the GPS receiver 31 detects a position of the antenna 31A using the information from the positioning satellites 5.

The scan matching navigation position output controller 33 determines the position of the dump truck 2 based on the information of the object that exists along the traveling path RP acquired from the detection result of the laser sensor 24B, and based on the map information that includes the position of the object that exists in the mine MR in advance. The scan matching navigation position output controller 33 is one of the plurality of positional information generation units included in the dump truck in the embodiment. The map information is accumulated in a map database (DB) 37.

In the embodiment, the vehicle body controller 20, the traveling path creation device 32, and the scan matching navigation position output controller 33 are implemented by a processor such as a central processing unit (CPU), and a memory. In such case, functions of the vehicle body controller 20, the traveling path creation device 32, and the scan matching navigation position output controller 33 are implemented when the processor reads and executes a computer program stored in the memory. The memory includes a nonvolatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, and a magnetic optical disk. The memory described above may be implemented by dedicated hardware, or the functions thereof may be implemented by the cooperation of a plurality of processing circuits.

The radar 24A and the laser sensor 24B are connected to the second signal line 36. In addition to the second signal line 36, the laser sensor 24B is also connected to the scan matching navigation position output controller 33. With the structure described above, the scan matching navigation position output controller 33 can directly receive a detection value of the laser sensor 24B.

The vehicle body controller 20 acquires the detection values from the radar 24A and the laser sensor 24B via the second signal line 36. The vehicle body controller 20 can determine a relative position between the dump truck 2 and the object using the detection values of the radar 24A and the laser sensor 24B. In other words, the relative position between the dump truck 2 and the object is detected when the radar 24A and the laser sensor 24B detect a position relative to the object.

The gyro sensor 26 detects an orientation or an orientation change amount of the dump truck 2. The gyro sensor 26 is connected to the vehicle body controller 20, and outputs a detection value, which is the detection result, to the vehicle body controller 20. The speed sensor 27 detects a traveling speed, which is the speed of the dump truck 2, by detecting a rotational speed of wheels of the dump truck 2. The speed sensor 27 is connected to the vehicle body controller 20, and outputs a detection value, which is the detection result, to the vehicle body controller 20.

<Estimation of Position of Dump Truck 2 by Dead Reckoning Navigation>

In the embodiment, the vehicle body controller 20 estimates the position of the dump truck 2 using the dead reckoning navigation. The dead reckoning navigation is a navigation to estimate a current position of the dump truck 2, which is a target, based on the orientation (orientation change amount) and a moving distance (speed) from the origin.

The orientation (orientation change amount) of the dump truck 2 is detected using the gyro sensor 26 included in the dump truck 2. The moving distance (speed) of the dump truck 2 is detected using the speed sensor 27 included in the dump truck 2. The vehicle body controller 20 determines the position of the dump truck 2 using the acquired orientation (orientation change amount) of the dump truck 2 and moving distance (speed) of the dump truck 2.

<Calculation of Position of Dump Truck 2 by Scan Matching Navigation Position Output Controller 33>

During the scan matching navigation traveling mode, the scan matching navigation position output controller 33 determines the position of the dump truck 2 using the detection value of the laser sensor 24B and the map information of the mine MR created in advance. In other words, the scan matching navigation position output controller 33 calculates the position of the dump truck 2 by collating the detection result of the laser sensor 24B and the map information.

In such case, the scan matching navigation position output controller 33 determines the position of the dump truck 2 using the detection value of the laser sensor 24B and the map information, and outputs the determined position thereof to the first signal line 35. The vehicle body controller 20 receives, via the first signal line 35, the position of the dump truck 2 determined by the scan matching navigation position output controller 33, and causes the dump truck 2 to travel along the traveling path RP.

The map information is information that includes a position of the object (such as the bank BK and the side wall) provided along the traveling path RP or the like in the mine MR. The map DB 37 that accumulates the map information is connected to the first signal line 35. It is necessary to create the map information in advance before calculating the position of the dump truck by the scan matching navigation. For the creation of the map information, for example, the detection result of the laser sensor 24B in the dump truck 2 traveling on the conveying path HL can be used. In a state where the position of the dump truck 2 is determined with high accuracy by the GPS receiver 31, for example, the presence/absence and the position of the bank BK provided along the conveying path HL are detected by the laser sensor 24B, and the presence/absence and positional data of the bank BK can be stored in the map information that corresponds to the conveying path HL.

Figure 5:
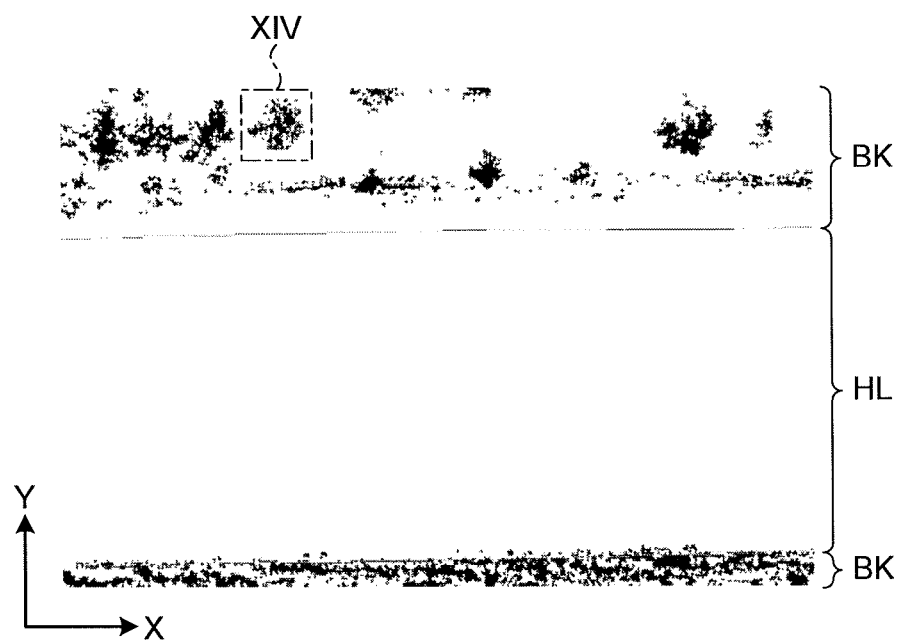
FIG. 5 is a diagram illustrating a portion of map data stored in a map-storing database of the control system according to the embodiment.
Figure 6:
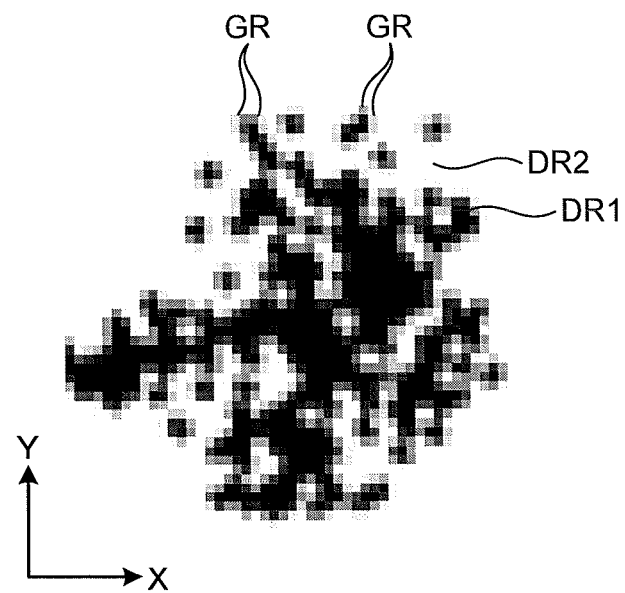
FIG. 6 is a diagram illustrating an enlarged view of an XIV portion in FIG. 5.

FIG. 5 is a diagram illustrating a portion of the map information in the embodiment. The portion of the map information in FIG. 5 indicates the detection result of the bank BK from the radar sensor 24B in an area around the conveying path HL. The conveying path HL is a blank area in a central portion that extends in an x-direction in FIG. 5. The bank BK is an area in which black and white are scattered in an upper portion and a lower portion in FIG. 5. As illustrated in FIGS. 5 and 6, in a plan view, the map information indicates a position of a grid GR in an XY-coordinate system where the mine MR is divided into predetermined sizes, and indicates whether the bank BK exists in each grid GR.

In the embodiment, among the grid GR in the map information, a grid DR1, which is a position in which the bank BK has been detected, is represented in a black square in the drawing, and a grid DR2, which is a position in which the bank BK has not been detected, is represented in a white square in the drawing. The map information stores the presence/absence of the bank BK, and the positional information. The map DB 37 that accumulates the map information is an external storage device (auxiliary storage device) that includes at least one of a ROM, a flash memory, and a hard disk drive.

Figure 7:
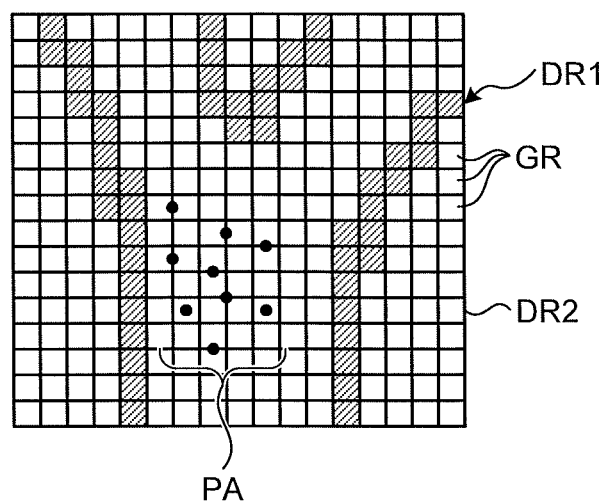
FIG. 7 is a schematic diagram illustrating an example of a partial area of map information according to the embodiment.
Figure 8:
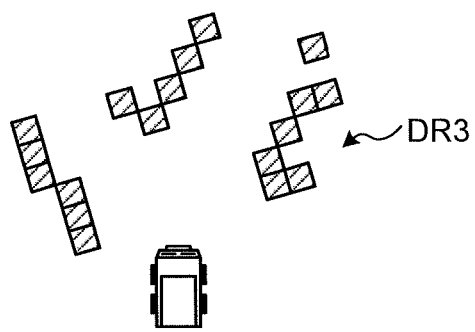
FIG. 8 is a schematic diagram illustrating an example of a detection result of a bank by a laser sensor when the dump truck has traveled on the conveying path.
Figure 9:
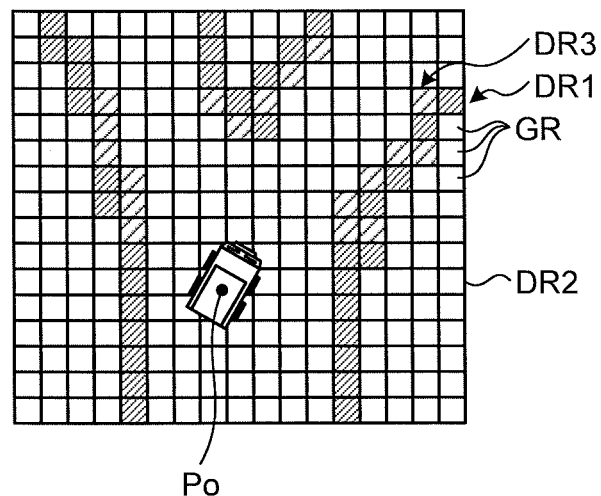
FIG. 9 is a schematic diagram illustrating a state in which the map information illustrated in FIG. 7 is collated with the detection result of the laser sensor illustrated in FIG. 8 in order to calculate a position of a corresponding vehicle by scan matching navigation.

FIG. 7 is a schematic diagram illustrating an example of a partial area of the map information according to the embodiment. FIG. 8 is a schematic diagram illustrating an example of the detection result of the bank BK by a laser sensor 24B when the dump truck has traveled on the conveying path HL. FIG. 9 is a schematic diagram illustrating a state in which the map information in FIG. 7 is collated with the detection result of the laser sensor 24B in FIG. 8 in order to calculate a position of the corresponding vehicle by the scan matching navigation. In FIGS. 7 to 9, the grid DR1, which is the position in which the bank BK exists in the map information, is represented in dense parallel oblique lines. In addition, a grid DR3, which is a position in which the bank BK has been detected by the laser sensor 24B, is represented in sparse oblique parallel lines.

Position calculation of the dump truck using the scan matching navigation illustrated in FIGS. 7 to 9 is performed by the scan matching navigation position output controller 33. In the position calculation of the position of the vehicle of the dump truck itself by the scan matching navigation position output controller 33, the position of the dump truck close to the real position can be calculated while the calculation cost is suppressed by using a plurality of points (particles) PA virtually disposed within a range in which the dump truck is expected to exist at a certain point of time. In order to calculate the position of the corresponding vehicle by the scan matching navigation using the particles, the orientation (orientation change amount) and information of the moving distance (speed) of the corresponding vehicle at the point of time, that is, information relating to the dead reckoning navigation, are required. Position estimation by the scan matching navigation using the particles is a known technique; therefore, detailed description thereof is omitted.

The position calculation by the scan matching navigation collates the detection result of the non-contact sensor and the map information in each calculation cycle for each calculation using the particles. Therefore, it takes certain amount of time for the calculation. Consequently, a delay caused by the processing in the scan matching navigation position output controller 33 is large.

In the map information illustrated in FIG. 7, each square represents the grid GR. In addition, the colored grid DR1 represents a grid in which the bank BK has been detected, and the white-colored grid DR2 represents a grid in which the bank BK has not been detected. FIG. 8 illustrates detection data DR3 that the laser sensor 24B of the dump truck has actually detected.

The map information illustrated in FIG. 7 is collated with the detection result of the laser sensor 24B illustrated in FIG. 8 for position estimation using the particles. Using the method for the position estimation, there is calculated a final estimate value (expected value) Po of a position in which the probability of existence of the dump truck 2 is assumed to be the highest as illustrated in FIG. 9. The scan matching navigation position output controller 33 outputs a position at the most approximate as the positional information of the dump truck 2. In the embodiment, the positional information of the dump truck 2 may include orientation information that indicates the orientation of the dump truck 2.

In the scan matching navigation traveling mode, the vehicle body controller 20 acquires the position of the dump truck 2 output from the scan matching navigation position output controller 33. Then, the vehicle body controller 20 controls the traveling of the dump truck 2 using the acquired information so that the dump truck 2 travels along the traveling path RP.

<Flow of Data During Scan Matching Navigation Traveling Mode>

In the embodiment, during the scan matching navigation traveling mode, the vehicle body controller 20 acquires the positional information of the dump truck 2 from the scan matching navigation position output controller 33 by communication. In addition, the scan matching navigation position output controller 33 receives, by communication, the detection result of the laser sensor 24B, the map information, and the speed and the orientation change amount of the corresponding vehicle which are information required for calculating the position of the dump truck 2 by the scan matching navigation. Specifically, the scan matching navigation position output controller 33 acquires the detection result from the laser sensor 24B, the map information from the map DB 37, and the detection value of the gyro sensor 26 and the detection value of the speed sensor 27 from the vehicle body controller 20.

The flow of data during the scan matching navigation traveling mode will be described in detail later. At first, the scan matching navigation position output controller 33 receives the detection values of the gyro sensor 26 and the speed sensor 27 from the vehicle body controller 20, receives the detection result from the laser sensor 24B, and receives the map information from the map DB 37. The scan matching navigation position output controller 33, then, calculates the position of the dump truck based on the scan matching navigation. Thereafter, the scan matching navigation position output controller 33 transmits a calculation result to the vehicle body controller 20. Then, the vehicle body controller 20 controls the vehicle based on the received position of the dump truck 2.

In the case of the present embodiment, the communication between the vehicle body controller 20 and the scan matching navigation position output controller 33 is performed twice. Therefore, in the control system 30, when a delay or the like occurs in the communication between the vehicle body controller 20 and the scan matching navigation position output controller 33, there is a possibility that the position and the orientation of the dump truck 2 that the vehicle body controller 20 has received from the scan matching navigation position output controller 33 differ from the position and the orientation at the time of the control of the dump truck 2 by the vehicle body controller 20.

Figure 10:
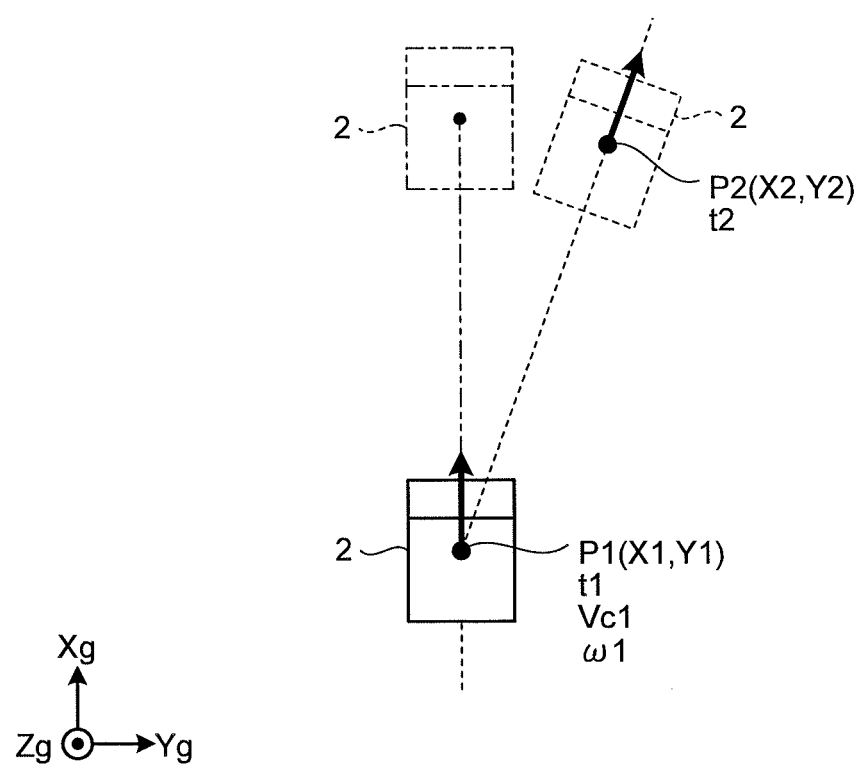
FIG. 10 is a diagram illustrating the dump truck that moves while delay in communication occurs.

FIG. 10 is a diagram illustrating the dump truck 2 that moves while the delay or the like in communication occurs. In a case where the position of the dump truck 2 is P1 at the time t1, the speed of the dump truck 2 detected by the speed sensor 27 is Vc1, and the angular speed of the dump truck 2 detected by the gyro sensor 26 is $\omega 1$. The time at which the speed Vc1 and the angular speed $\omega 1$ have been acquired is t1. The scan matching navigation position output controller 33 receives, by communication, the detection result of the gyro sensor 26, the detection result of the speed sensor 27, and the received detection result of the laser sensor 24B and map information. Based on the pieces of received information, the scan matching navigation position output controller 33 calculates the position P1 of the dump truck 2 at the time t1.

The vehicle body controller 20 receives the position P1 of the dump truck 2 determined by the scan matching navigation position output controller 33, and controls the traveling of the dump truck 2 based on the received position P1. The timing of when the vehicle body controller 20 starts controlling the traveling of the dump truck 2 based on the position P1 is time t2. In such case, there is a time lag between the time t1 and the time t2. Therefore, at the time t2, the vehicle body controller 20 controls the traveling based on the position P1 of the dump truck 2 at the time t1 and thus, the control of the traveling is not performed accurately.

Accordingly, by correcting the position P1 of the dump truck 2 at the time t1 determined by the scan matching navigation position output controller 33, the vehicle body controller 20 calculates a corrected position P1c in which the dump truck 2 is likely to exist at the time t2, and generates a command for controlling the dump truck 2 based on the corrected position P1c. Details of a correcting method for the position will be described later. In FIG. 10, the actual position of the dump truck 2 at time t2 is P2. Hereinafter, the time t1 is appropriately referred to as first time t1, and the time t2 is appropriately referred to as second time t2.

When a delay occurs in the communication between the vehicle body controller 20 and the scan matching navigation position output controller 33, the second time t2 is delayed compared to the first time t1. The difference $\Delta t$ ($=t2-t1$) between the second time t2 and the first time t1 is referred to as delay time. The delay time $\Delta t$ includes a communication delay of when the vehicle body controller 20 receives positional information, which is information of the position P1 at the t1, from the scan matching navigation position output controller 33, and includes a delay caused by the position calculation processing in the scan matching navigation position output controller 33. The delay time may include a communication delay of when the scan matching navigation position output controller 33 receives the detection results of the gyro sensor 26 and the speed sensor 27 from the vehicle body controller 20. In addition, the delay time Δt may include, for example, a delay caused by instantaneous interruption of the communication between the vehicle body controller 20 and the scan matching navigation position output controller 33.

Moreover, the delay time Δt may include, other than the delay in communication, a delay caused due to the difference between a control cycle of the vehicle body controller 20 and a control cycle of the scan matching navigation position output controller 33. For example, when the control cycle of the scan matching navigation position output controller 33 is longer than the control cycle of the vehicle body controller 20, there is a possibility that the positional information that the vehicle body controller 20 received from the scan matching navigation position output controller 33 is a control cycle in the past compared to the control cycle in which the vehicle body controller 20 controls the dump truck 2. In other words, the vehicle body controller 20 belatedly receives the positional information determined by the scan matching navigation position output controller 33. The delay time Δt may include the delay described above.

The dump truck 2 moves from the position P1 to the position P2 during the delay time Δt. As the delay time Δt increases, the distance between the position P2 and the position P1 gets longer. In a case of controlling the dump truck 2 at the position P2, the vehicle body controller 20 uses the position that the scan matching navigation position output controller 33 has determined, that is, the position P1. As a result, there is a possibility that the accuracy of the vehicle body controller 20 to control the dump truck 2 reduces as the distance between the actual position P2 of the dump truck 2 at the timing of when the vehicle body controller 20 controls the dump truck 2 and the position P1 gets longer.

The vehicle body controller 20 of the control system 30 corrects the position P1 using the delay time Δt. Then, the vehicle body controller 20 causes the dump truck 2 to autonomously travel by generating and outputting the command that controls the dump truck 2 using the corrected position P1c, which is the position after the correction. Next, an example of processing in which the control system 30 determines the position of the dump truck 2 using the delay time will be described.

<Exemplary Processing of Control System 30>

Figure 11:
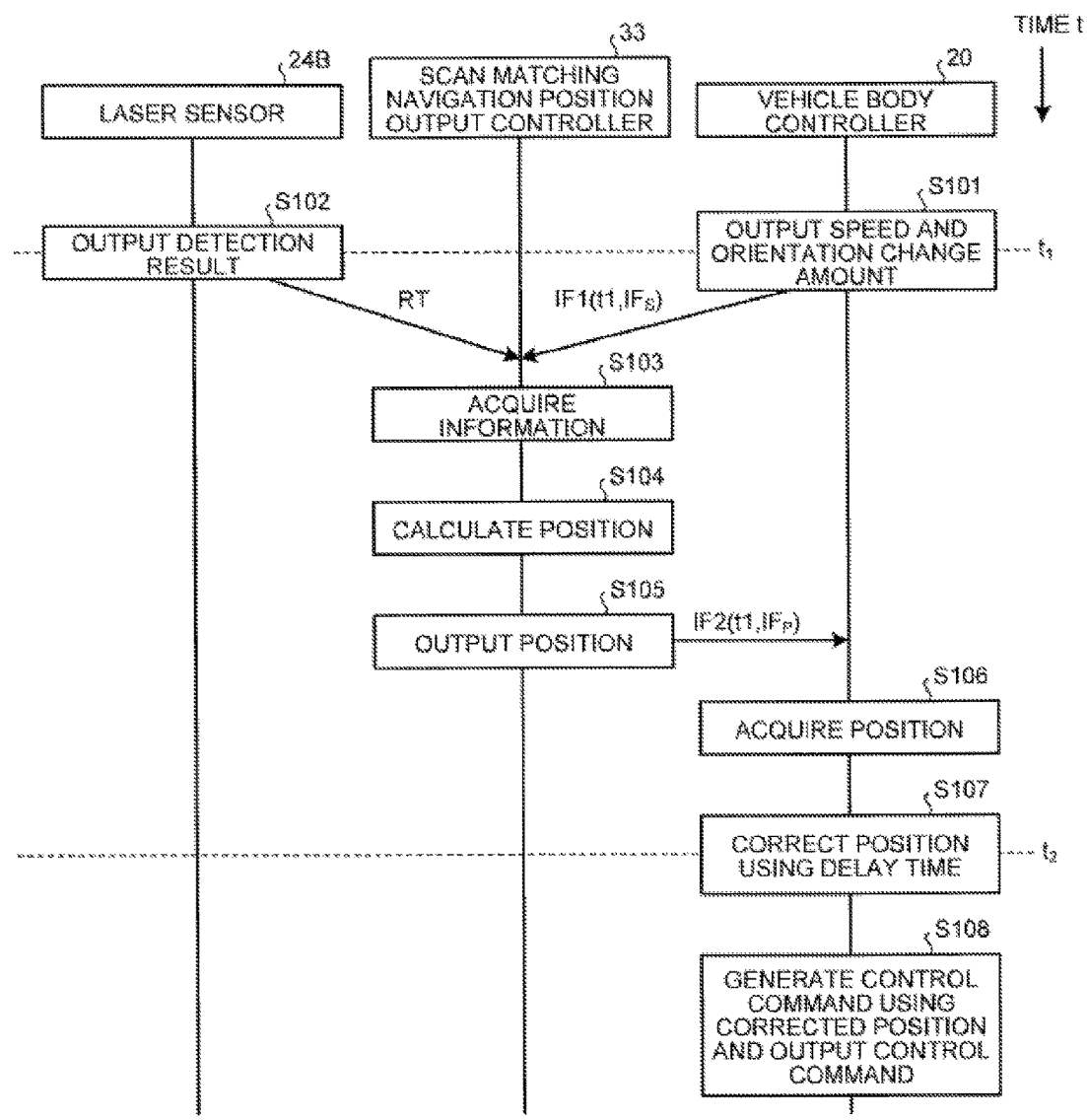
FIG. 11 is a flowchart describing exemplary processing of when the control system according to the embodiment executes a control method for a work machine according to the embodiment.
Figure 12:
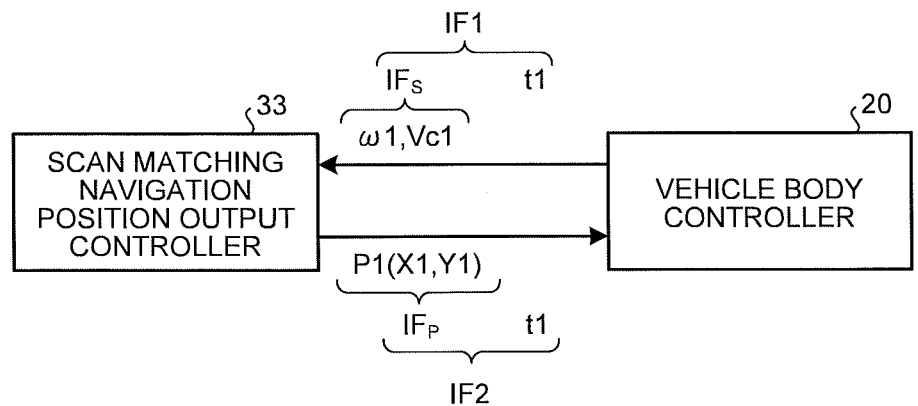
FIG. 12 is a diagram for describing an exchange of information between the vehicle body controller and a scan matching navigation position output controller.

FIG. 11 is a flowchart describing exemplary processing of when the control system 30 according to the embodiment executes a control method for a work machine according to the embodiment. FIG. 12 is a diagram for describing an exchange of information between the vehicle body controller 20 and the scan matching navigation position output controller 33.

In a case where the control system 30 causes the dump truck 2 to autonomously travel, in step S101, the vehicle body controller 20 outputs information IFs for the scan matching navigation position output controller 33 to determine the position P1 of the dump truck 2. In the embodiment, the information IFs is the angular speed ω1, which is the detection value of the gyro sensor 26, and the speed Vc1, which is the detection value of the speed sensor 27. Hereinafter, the information IFs is appropriately referred to as vehicle body information IFs.

In the embodiment, the vehicle body controller 20 outputs the vehicle body information IFs to the first signal line 35 together with the first time t1 at which the vehicle body information IFs has been acquired. According to the processing described above, the vehicle body controller 20 transmits the first time t1 at which the vehicle body information IFs has been acquired, and the vehicle body information IFs to the scan matching navigation position output controller 33. In the embodiment, the vehicle body controller 20 transmits the vehicle body information IFs to the scan matching navigation position output controller 33 in the control cycle in which the vehicle body information IFs has been received. Moreover, in the embodiment, the first time t1 at which the vehicle body information IFs has been acquired is the time when the vehicle body information IFs has been transmitted to the scan matching navigation position output controller 33. The first time t1 may be the time when the vehicle body controller 20 has received the detection results from the gyro sensor 26 and the speed sensor 27.

The first time t1 and the vehicle body information IFs are, as illustrated in FIG. 12, output from the vehicle body controller 20 as first information IF1. In the embodiment, the first information IF1 includes the first time t1 and the vehicle body information IFs. In step S102, the laser sensor 24B outputs a detection result RT.

In step S103, the scan matching navigation position output controller 33 receives the first information IF1, the detection result RT of the laser sensor 24B, and the map information of the map DB 37 (omitted in FIG. 11) by communicating with the vehicle body controller 20 via the first signal line 35. As described above, since the first information IF1 includes the vehicle body information IFs, in step S103, the scan matching navigation position output controller 33 receives the vehicle body information IFs from the vehicle body controller 20. Then, in step S104, the scan matching navigation position output controller 33 determines the position P1 of the dump truck 2 using the received vehicle body information IFs, and outputs the determined position P1 as positional information IFp to the first signal line 35.

The positional information IFp includes at least coordinates P1 (X1, Y1) of the position P1 of the dump truck 2 determined using the vehicle body information IFs included in the first information IF1. The positional information IFp may include an orientation angle θ of the dump truck 2 determined using the vehicle body information IFs. The orientation angle θ is information that indicates the orientation of the dump truck 2 at the position P1. In step S105, by outputting the positional information IFp to the first signal line 35 together with the first time t1 included in the first information IF1, the scan matching navigation position output controller 33 transmits the positional information IFp to the vehicle body controller 20. This means that the position of the dump truck at the first time t1 is P1 (X1, Y1).

The first time t1 and the positional information IFp are, as illustrated in FIG. 12, output from the scan matching navigation position output controller 33 as second information IF2. In the embodiment, as illustrated in FIG. 14, the second information IF2 includes the first time t1 and the positional information IFp.

In step S106, the vehicle body controller 20 receives the second information IF2 by communicating with the scan matching navigation position output controller 33 via the first signal line 35. As described above, since the second information IF2 includes the positional information IFp, in step S106, the vehicle body controller 20 receives the positional information IFp from the scan matching navigation position output controller 33. Then, in step S107, the vehicle body controller 20 corrects the received position P1 using the delay time Δt. In step S108, the vehicle body controller 20 generates the control command, which is the command for controlling the dump truck 2, using the corrected position P1c, outputs the control command to the steering device 2S and/or the traveling control device 2D and thereafter, controls the dump truck 2.

In step S107, the vehicle body controller 20 determines the corrected position P1c by correcting the position P1 using the dead reckoning navigation. The correcting method will be described. In such case, the origin is the position P1. A moving distance from the position P1 is determined from the product of the speed Vc1 and the delay time Δt. The orientation from the position P1 is determined from the angular speed ω1. In other words, the method for correcting the position of the dump truck 2 at the second time t2 based on the position P1 at the first time t1 can be performed by the same method as the dead reckoning navigation.

The delay time Δt is the difference between the second time t2 and the first time t1. The second time t2 is the time when the vehicle body controller 20 starts calculating the command for controlling the dump truck 2, and also the time when the position P1 is corrected. The first time t1 is the time when the vehicle body information IFs, which is for determining the position P1 of the dump truck 2, has been acquired, and the time before the second time t2, which is when the position P1 is corrected.

In the embodiment, steps S101 and S102 do not necessarily have to be the same timing (first time t1). Moreover, the first time t1 may be the time of output in step S101, the time of output in step S102, the time of acquisition of the information in step S103, the time of processing in step S104, or the time of output of the positional information IFp in step S105.

As illustrated in FIG. 12, based on the speed Vc1 and the angular speed ω1, a position to which the dump truck 2 proceeds by a distance Vc1×Δt from the position P1 that corresponds to the first time t1 is the corrected position P1c. In other words, during the delay time Δt, the vehicle body controller 20 determines, using the dead reckoning navigation, the position to which the dump truck 2 has moved from the position P1 received from the scan matching navigation position output controller 33, and defines the determined position as a position after the correction, that is, the corrected position P1c. Thereafter, the vehicle body controller 20 controls the dump truck 2 using the corrected position P1c. Therefore, the influence of at least one of the delay caused by the communication between the vehicle body controller 20 and the scan matching navigation position output controller 33, the delay caused by instantaneous interruption of the communication, the delay caused by a difference in the control cycles, the delay caused by the processing in the scan matching navigation position output controller 33, and the like is reduced. As a result, reduction in accuracy when the vehicle body controller 20 controls the dump truck 2 is suppressed.

Modified Example

Figure 13:
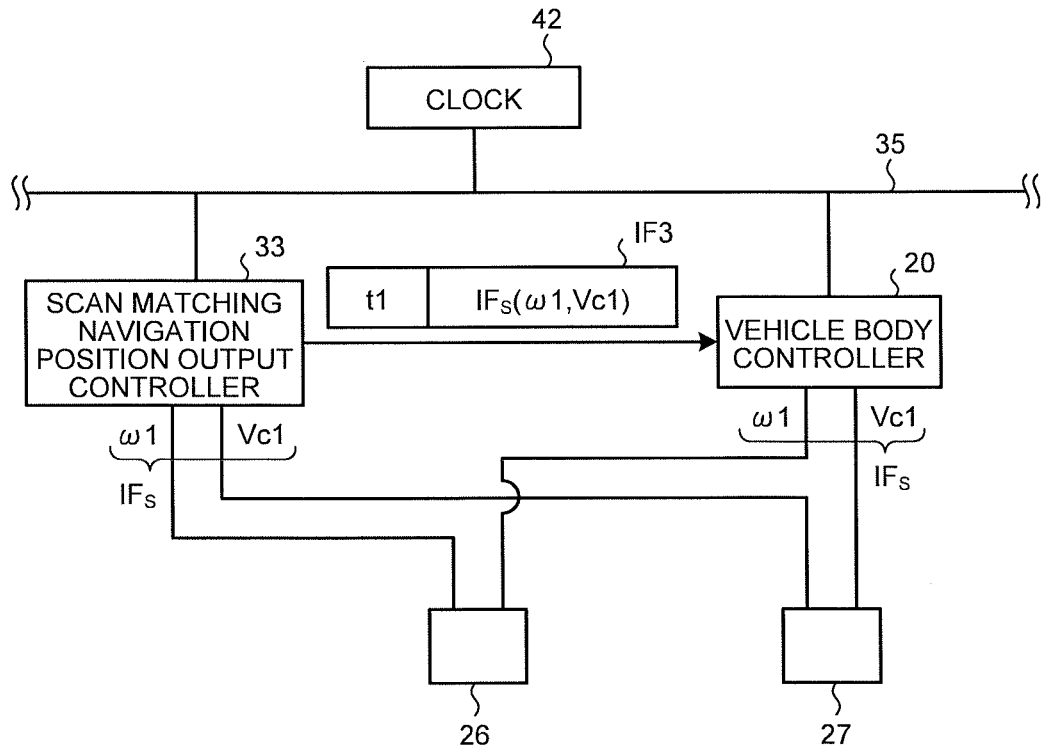
FIG. 13 is a diagram illustrating a portion of a control system according to a modified example of the embodiment.

FIG. 13 is a diagram illustrating a portion of a control system 30a according to a modified example of the embodiment. In the control system 30a, a gyro sensor 26 and a speed sensor 27 are connected, not only to a vehicle body controller 20, but also to a scan matching navigation position output controller 33. In the control system 30a, an output from a clock 42 that counts time is input to the vehicle body controller 20 and the scan matching navigation position output controller 33. With the structure described above, the vehicle body controller 20 and the scan matching navigation position output controller 33 operate in the same time system, that is, a time system of the clock 42.

At first time t1, the scan matching navigation position output controller 33 acquires an angular speed ω1 of a dump truck 2 from the gyro sensor 26, and acquires a speed Vc1 of the dump truck 2 from the speed sensor 27. The scan matching navigation position output controller 33 determines a position P1 of the dump truck 2 using vehicle body information IFs, i.e., the speed Vc1 and the angular speed ω1, a detection result of a laser sensor 24B, and map information of a map DB 37. Specifically, coordinates P1 (X1, Y1) of the position P1 are determined. Then, together with the first time t1, the scan matching navigation position output controller 33 outputs positional information IFp including the coordinates P1 (X1, Y1) as information IF3 to a first signal line 35. The information IF3 is the same as second information IF2.

After receiving the information IF3 via the first signal line 35, the vehicle body controller 20 corrects the position P1 that corresponds to the positional information IFp of the information IF3 using dead reckoning navigation at second time t2. At this time, delay time Δt which is the difference between the second time t2 and the first time t1 is used. Thereafter, the vehicle body controller 20 controls the dump truck 2 using a corrected position P1c which is the position P1 after the correction. As described above, also in the modified example, the scan matching navigation position output controller 33 determines the position using the vehicle body information IFs for determining the position P1. In addition, also in the modified example, in a case where the position P1 is corrected by the dead reckoning navigation, the delay time Δt which is the difference between the second time t2, which is when the vehicle body controller 20 corrects the position P1, and the first time t1, which is the time before the second time t2 and when the vehicle body information IFs has been acquired.

In the embodiment and the modified example thereof, the vehicle body controller 20 that controls the dump truck 2 corrects the position of the dump truck 2 determined by the scan matching navigation position output controller 33 using the delay time Δt including a delay of information transmission in the control system 30, such as a delay of information transmission due to a delay in communication and the difference in the control cycles. Then, the vehicle body controller 20 controls the dump truck 2 using the corrected position P1c acquired by the correction. Therefore, the control system 30 can reduce the influence of the delay of the information transmission in the control system 30. Specifically, the control system 30 can reduce the influence of the delay caused when the vehicle body controller 20 receives the information of the position P1 from the scan matching navigation position output controller 33. As a result, the control system 30 can suppress the delay caused when the vehicle body controller 20 controls the dump truck 2 and suppress the reduction in accuracy thereof even in the case where the delay occurs at the timing at which the vehicle body controller 20 acquires the position of the dump truck 2 due to the delay of communication or the like.

In the embodiment and the modified example, an example in which the working vehicle is the mining machine used in a mine has been described. However, the working vehicle is not limited to the mining machine. The working vehicle should at least include the traveling device 23 and the braking device 2B. The working vehicle may be, for example, a working vehicle used in an underground mine and a working vehicle used at a work site on the ground. The working vehicle is considered to include the mining machine.

In the embodiment and the modified example, the working vehicle has been the dump truck 2. However, the working vehicle may be a wheel loader, a grader, or a general vehicle 3C. In addition, in the embodiment and the modified example, the dump truck 2 has been an unmanned dump truck. However, the dump truck 2 is not limited to this, and may be configured to assist an operation of a manned dump truck.

The method for the scan matching navigation position output controller 33 to determine the position of the dump truck 2 is also not limited to the embodiment and the modified example. As long as the method calculates a current position of the dump truck 2 by comparing the detection result by the non-contact sensor 24 with the map information 37 stored in advance, the method may be any method. In the embodiment and the modified example, the radar sensor and the laser sensor have been exemplified as the non-contact sensor 24. However, the non-contact sensor 24 is not limited to these. For example, the non-contact sensor 24 may detect the situation around the dump truck 2 using a stereo camera or a mono camera.

In the embodiment and the modified example, the position of the working vehicle has been detected using the GPS detector. However, the detection of the position of the working vehicle is not limited to the GPS detector, and the position of the working vehicle may be detected based on a known positional information generation unit. In particular, the GNSS is not possible to be detected in an underground mine; therefore, for example, a self-position estimation or the like of the working vehicle that uses an indoor messaging system (IMES) which is a positional information generation unit, a pseudolite, a radio frequency identifier (RFID), a beacon, a survey instrument, a wireless LAN, an ultra wide band (UWB), a simultaneous localization and mapping (SLAM), or a landmark (a mark provided along the traveling path) may be used.

In the embodiment and the modified example, when the dump truck 2 is braked so as to be in a target speed at a target position, reduction in the accuracy required for the position of the working vehicle that has reached the target position can be suppressed while an impact generated on the dump truck 2 is suppressed. In particular, since the dump truck 2 used in the mine is large in mass, the impact is likely to be generated on the dump truck 2 at the time of braking. However, in the embodiment described above, the reduction in the accuracy of the position to stop or the like can be suppressed while the impact on the dump truck 2 is suppressed. Therefore, such embodiment is suitable for a large-scale working vehicle used in the mine.

The present embodiment and the modified example thereof have been described. However, the present embodiment and the modified example are not limited by the contents described above. The components described above include the one that can be easily envisioned by those skilled in the art, is substantially the same, and is within a so-called equivalent range. The components described above can be combined in any appropriate manner. Furthermore, at least one of various omissions, substitutions, and modifications of the components can be made without departing from the spirit of the embodiment and the modified example.

REFERENCE SIGNS LIST

1 Management system
2 Dump truck
3 Mining machine
3C Vehicle
3S Excavator
7 Control facility
9 Communication system
10 Management device
20 Vehicle body controller (control device)
21 Vehicle main body
22 Vessel
23 Traveling device
24 Obstacle sensor
24A Radar (non-contact sensor)
24B Laser sensor (non-contact sensor)
26 Gyro sensor
27 Speed sensor
30, 30a Work machine control system (control system)
31 Receiver
31A Antenna
32 Traveling path creation device
33 Scan matching navigation position output controller (position output device)
34 Wireless communication device
35 First signal line
36 Second signal line
37 Map DB
Δt Delay time

The invention claimed is:

1. A control system for a work machine, comprising:
a non-contact sensor configured to detect a periphery of a work machine;
a gyro sensor configured to detect an orientation or an orientation change amount of the work machine;
a speed sensor configured to detect a traveling speed of the work machine;
a control device mounted on the work machine, and configured to receive detection results of the gyro sensor and the speed sensor; and
a position output device mounted on the work machine, and configured to receive the detection results of the gyro sensor and the speed sensor from the control device, determine a position of the work machine based on a detection result of the non-contact sensor, map information including the position of an object existing in a mine in advance, the detection results of the gyro sensor and the speed sensor from the control device, and output information of the position to the control device; wherein
the control device and the position output device exchange information by communicating with one another via a signal line,
the control device defines time when the control device transmits the detection results of the gyro sensor and the speed sensor to the position output device as first time,
the control device defines time when the control device starts to control the traveling of the work machine based on the position of the work machine as second time,
the control device defines a difference between the first time and the second time as delay time,
the control device includes:
a correction position calculation unit that corrects the position determined by the position output device, based on the delay time; and
a traveling control unit that generates a command for controlling the work machine based on a corrected position corrected by the correction position calculation unit.

2. The control system for a work machine according to claim 1, wherein
the position output device determines the position of the work machine based on the detection result of the non-contact sensor, the map information including the position of the object existing in the mine in advance, the detection results of the gyro sensor and the speed sensor from the control device, by using scan matching navigation, and outputs information of the position to the control device, and
the control device determines a position to which the work machine has moved, during the delay time, based on the position from the position output device and corresponding to the first time, the detection results of the gyro sensor and the speed sensor, and the delay time, by using dead reckoning navigation, and defines the determined position as the corrected position.

3. The control system for a work machine according to claim 1, wherein
the control device reduces an influence of at least one of
the delay caused by the communication between the control device and the position output device,
the delay caused by instantaneous interruption of the communication between the control device and the position output device,
the delay caused by a difference in the control cycles between the control device and the position output device, and
the delay caused by the processing in the position output device,
by controlling the work machine based on the corrected position.

4. A work machine comprising:
the control system for a work machine according to claim 1; and
a traveling device controlled by the control device included in the control system for the work machine.

5. A control method for a work machine, comprising:
detecting a periphery of a work machine by a non-contact sensor;
detecting an orientation or an orientation change amount of the work machine by a gyro sensor;
detecting a traveling speed of the work machine by a speed sensor;
defining time when detection results of the gyro sensor and the speed sensor are transmitted from an on-board control device to an on-board position output device via a signal line as first time;
determining a position of the work machine based on a detected result of the non-contact sensor, map information including the position of an object existing in a mine in advance, and the detection results of the gyro sensor and the speed sensor, and outputting information of the position from the on-board position output device to the on-board control device via the signal line;
defining time when controlling the traveling of the work machine based on the position of the work machine is started as second time;
defining a difference between the first time and the second time as delay time;
correcting the position of the work machine based on the output information of the position and the delay time; and
generating a command for controlling the work machine based on a corrected position of the work machine.

* * * * *